United States Patent
Bleckmann et al.

(10) Patent No.: US 10,502,107 B2
(45) Date of Patent: *Dec. 10, 2019

(54) EXHAUST GAS AFTER-TREATMENT UNIT FOR AN INTERNAL COMBUSTION ENGINE AND PROCEDURE FOR USING A DRIVE MECHANISM WITH SUCH AN EXHAUST GAS AFTER-TREATMENT UNIT

(71) Applicant: Daimler AG, Stuttgart (DE)

(72) Inventors: Johannes Bleckmann, Stuttgart-Ost (DE); Claudia Essmann, Stuttgart (DE); Uwe Gaertner, Remshalden (DE); Alexander Massner, Esslingen (DE); Michael Stiller, Remseck (DE)

(73) Assignee: Daimler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/778,793

(22) PCT Filed: Nov. 14, 2016

(86) PCT No.: PCT/EP2016/001892
§ 371 (c)(1),
(2) Date: May 24, 2018

(87) PCT Pub. No.: WO2017/088958
PCT Pub. Date: Jun. 1, 2017

(65) Prior Publication Data
US 2018/0347423 A1   Dec. 6, 2018

(30) Foreign Application Priority Data
Nov. 26, 2015   (DE) .......................... 10 2015 015 260

(51) Int. Cl.
*F01N 3/035*   (2006.01)
*F01N 3/10*   (2006.01)
(Continued)

(52) U.S. Cl.
CPC ......... *F01N 3/035* (2013.01); *B01D 46/0027* (2013.01); *B01D 53/9418* (2013.01);
(Continued)

(58) Field of Classification Search
CPC .... F01N 3/035; F01N 13/0097; F01N 13/009; F01N 3/106; F01N 3/2066; F01N 2370/00
(Continued)

(56) References Cited

U.S. PATENT DOCUMENTS 7,257,941 B1 * 8/2007 Reuter .................... F01N 3/035
60/274
8,778,290 B1   7/2014 Ren et al.
(Continued)

FOREIGN PATENT DOCUMENTS

DE   10 2009 038 835 A1   3/2011
WO   WO 2008/030314 A1   3/2008
(Continued)

OTHER PUBLICATIONS

PCT/EP2016/001892, International Search Report dated Jan. 30, 2017 (Three (3) pages).
(Continued)

*Primary Examiner* — Tom P Duong
(74) *Attorney, Agent, or Firm* — Crowell & Moring LLP

(57) ABSTRACT

An exhaust gas after-treatment unit for an internal combustion engine, particularly for a motor vehicle, includes a first selective catalytic reduction (SCR) catalytic converter through which the exhaust gas from the internal combustion engine can flow and at least one particle filter for retaining the soot particles from the exhaust gas. The particle filter, which is located downstream from the first SCR catalytic converter, is equipped with a heavy metal and precious metal free catalyzing coating which oxidizes the soot particles
(Continued)

retained by the particle filter, where downstream from the particle filter there is a second SCR catalytic converter through which the exhaust gas can flow.

12 Claims, 3 Drawing Sheets

(51) Int. Cl.
    *F01N 3/20*             (2006.01)
    *F01N 3/021*           (2006.01)
    *F01N 13/00*           (2010.01)
    *B01D 46/00*          (2006.01)
    *B01D 53/94*          (2006.01)

(52) U.S. Cl.
    CPC ..... *B01D 53/9431* (2013.01); *B01D 53/9436* (2013.01); *B01D 53/9495* (2013.01); *F01N 3/021* (2013.01); *F01N 3/106* (2013.01); *F01N 3/208* (2013.01); *F01N 3/2066* (2013.01); *F01N 13/009* (2014.06); *F01N 13/0093* (2014.06); *F01N 13/0097* (2014.06); *B01D 2255/20723* (2013.01); *B01D 2255/20761* (2013.01); *B01D 2255/911* (2013.01); *B01D 2279/30* (2013.01); *F01N 2370/00* (2013.01); *F01N 2370/02* (2013.01); *F01N 2510/06* (2013.01); *F01N 2610/02* (2013.01); *F01N 2610/03* (2013.01); *F01N 2900/1821* (2013.01); *Y02A 50/2325* (2018.01); *Y02T 10/24* (2013.01)

(58) Field of Classification Search
    USPC .......................... 422/168; 60/274, 286, 297
    See application file for complete search history.

(56) References Cited

U.S. PATENT DOCUMENTS

| | | | |
|---|---|---|---|
| 2004/0018939 A1 | 1/2004 | Chigapov et al. | |
| 2006/0010859 A1* | 1/2006 | Yan ........................ | F01N 3/035 60/286 |
| 2010/0180580 A1* | 7/2010 | Boorse .................... | F01N 3/035 60/297 |
| 2011/0138776 A1 | 6/2011 | Huang et al. | |
| 2011/0138777 A1* | 6/2011 | Jen .......................... | F01N 3/035 60/274 |
| 2014/0363358 A1 | 12/2014 | Udd et al. | |
| 2015/0204226 A1 | 7/2015 | Moore | |
| 2017/0298796 A1* | 10/2017 | Naseri ................... | F01N 3/2066 |
| 2018/0080359 A1* | 3/2018 | Price ..................... | B01J 35/0006 |

FOREIGN PATENT DOCUMENTS

| | | |
|---|---|---|
| WO | WO 2013/095214 A1 | 6/2013 |
| WO | WO 2015/130211 A1 | 9/2015 |

OTHER PUBLICATIONS

German Search Report issued in German counterpart application No. 10 2015 015 260.2 dated Aug. 4, 2016, with Statement of Relevancy (Ten (10) pages).

\* cited by examiner

EXHAUST GAS AFTER-TREATMENT UNIT FOR AN INTERNAL COMBUSTION ENGINE AND PROCEDURE FOR USING A DRIVE MECHANISM WITH SUCH AN EXHAUST GAS AFTER-TREATMENT UNIT

BACKGROUND AND SUMMARY OF THE INVENTION

The invention relates to an exhaust gas after-treatment unit for an internal combustion engine, particularly for a motor vehicle, a drive mechanism with such an exhaust gas after-treatment unit and a procedure for using such a drive mechanism.

Exhaust gas after-treatment units for internal combustion engines, especially for motor vehicles, have long been known from the general prior art and particularly from serial vehicle manufacturing. Such an exhaust gas after-treatment unit is used, for example, in a drive mechanism which comprises the exhaust gas after-treatment unit and an internal combustion engine. The drive system is, for example, part of a motor vehicle which is drivable by means of the drive mechanism, particularly by means of the internal combustion engine. The internal combustion engine is a combustion engine.

The internal combustion engine has at least one combustion chamber in the form of a cylinder into which fuel, particularly liquid fuel, and air are fed during the internal combustion engine's fired operation. This creates a fuel air mixture in the combustion chamber which is burned. This results in exhaust gas from the internal combustion engine, wherein the exhaust gas can flow out from at least one internal combustion engine outlet and, therefore, out of the internal combustion engine itself.

By means of an exhaust pipe, for example, the exhaust gas is directed toward the exhaust gas after-treatment unit so that the internal combustion engine exhaust gas can be after-treated using the exhaust gas after-treatment unit. To this end, the exhaust gas after-treatment unit comprises at least one SCR catalytic converter through which the internal combustion engine exhaust gas can flow, by means of which a selective catalytic reduction (SCR) is brought about and supported. This means that the SCR catalytic converter catalyzes the SCR. By means of this selective catalytic reduction, the nitrogen oxide (NOx) contained within the exhaust gas is reduced, meaning that it is at least partially removed from the exhaust gas. In the course of the SCR, the nitrogen oxide contained within the exhaust gas reacts particularly with elements of a reduction agent which is introduced to the exhaust gas or with elements which form from the reduction agent to become nitrogen and water. Without limitation of generality, it is assumed hereafter that the reduction agent deployed within the framework of the present invention is an aqueous urea solution. The ammonia (NH3) which is effective in the SCR for the reduction of nitrogen oxide is created from the aqueous urea solution.

The exhaust gas after-treatment unit further comprises at least one particle filter, through which the exhaust gas can flow, for retaining the exhaust gas soot particles. The exhaust gas is filtered by means of the particle filter so that at least some of the soot particles are filtered from the exhaust gas by means of the particle filter. If the internal combustion engine comprises a diesel engine, for example, the particle filter is usually described as a diesel particle filter (DPF).

The objective of the present invention is to further develop an exhaust gas after-treatment unit of the type already stated which allows for especially favorable operation in terms of exhaust emissions to be realized.

To further develop an exhaust gas after-treatment unit, which makes particularly favorable operation in terms of exhaust emissions feasible, it is envisaged according to the invention that the particle filter which is located downstream from the first SCR catalytic converter in the direction of exhaust gas flow through the exhaust gas after-treatment unit is equipped with a heavy metal and precious metal free catalyzing coating which oxidizes the soot particles held back by the particle filter, wherein there is a second SCR catalytic converter through which the exhaust gas can flow downstream from the particle filter. The heavy metal and precious metal free particle filter coating in the exhaust gas after-treatment unit according to the invention benefits from having no environmentally damaging heavy metals and no other toxic or environmentally damaging materials.

In an embodiment of the invention, the heavy metal and precious metal free particle filter coating contains alkaline and/or alkaline-earth compounds. More preferably, the heavy metal and precious metal free particle filter coating possesses alkaline metal silicate, wherein finely distributed alkaline metals in a silicate structure, especially potassium, are incorporated as active catalytic coating components. Particle filters with a coating according to the embodiment of the invention can catalyze beneficial solid-state reactions with soot particles. Coatings of the particle filter according to the embodiment of the invention can be applied to different substrates such as SIC or Cordierit, for example. Coating the particle filter according to the embodiment of the invention allows for nitrogen dioxide (NO2) based particle filter regeneration, even with small quantities of nitrogen dioxide and/or already low temperatures, as the reaction of the soot or soot particles with nitrogen dioxide in the particle filter, which is catalyzed by means of the coating, is a solid-state reaction, which is catalyzed, meaning it is supported or brought about, by the coating. This reaction can take place with a particularly high reaction rate. At the same temperature conditions, the reaction of the soot with nitrogen dioxide even takes place with smaller quantities of nitrogen dioxide and with higher reaction rates can be observed taking place in a particle filter with a coating according to the embodiment of the invention compared with a particle filter with a precious metal coating. The oxygen (O2) based soot oxidation is also catalyzed using a coating according to the embodiment of the invention and takes place on such coatings even at considerably lower temperatures than in particle filters with precious metal coatings. Therefore, soot can be oxidized with O2 to carbon dioxide (CO2) and steam (H2O) on a coating according to the embodiment of the invention at these low temperatures even when NO2 is excluded, particularly during the dispensing of the aqueous urea solution.

Particle filter regeneration should be understood as at least some of the soot particles which are retained in the particle filter being removed from the particle filter within the framework of the regeneration. With increasing operation times and, therefore, with increasing numbers of exhaust gas soot particles being retained, increasing numbers of soot particles are being added to the particle filter. This addition is also known as particle filter loading. Within the framework of a regeneration, the particle filter loading is at least reduced in that the soot particles are oxidized. This means that the particle filter is, for example, oxidized with NO2 or freely burned with O2 within the framework of the regeneration. The particle filter coating has the role of catalyzing the soot particle oxidation and a coating of the particle filter with alkaline and/or alkaline-earth compounds facilitates an NO2 based particle filter regeneration for significantly smaller quantities of NO2 and with a higher reaction rate than when compared to coating the particle filters with catalytic coatings containing precious metals.

It was surprisingly found that the particle filter coating with alkaline and/or alkaline-earth compounds catalyzes the particle filter regeneration with the help of NO2 particularly well, so that such a regeneration based on NO2 leads to a sufficient soot combustion rate even with low initial concentrations of NO2, such as the internal combustion engine's NO2 raw emissions, and that it is not essential to continually carry out NO2 based regeneration in particle filters with such a coating, rather that a regeneration which is performed intermittently is sufficient. Regeneration with the help of NO2 is referred to as passive regeneration.

Because O2 based particle filter regeneration takes place at significantly lower temperatures in particle filters with alkaline and/or alkaline-earth compound coatings than in particle filters with precious metal coatings, the O2 based regeneration will support the NO2 based regeneration even at temperatures from around 300 to 350 degrees Celsius in particle filters with a coating with alkaline and/or alkaline-earth compounds. The O2 based soot regeneration can also sometimes replace the NO2 based regeneration within a temperature window of 300 to 350 degrees Celsius if the NO2 based regeneration is restricted or fails completely due to low NO2 concentrations, as is the case when the total amount of NO2 present in the exhaust gas is consumed in the SCR reaction in the preceding first SCR catalytic converter. In particle filters with, known precious metal coatings, the O2 based soot oxidation rates within a temperature range of around 300 to 350 degrees Celsius is considerably lower than in particle filters with a coating with alkaline and/or alkaline-earth compounds and, therefore, do not contribute to soot combustion.

Due to the fact that O2 based particle filter generation takes place even within a temperature range of around 300 to 350 degrees Celsius in particle filters with an alkaline and/or alkaline-earth compound coating, an O2 based particle filter regeneration can be used without the disadvantageous undesired damage to the exhaust gas after-treatment elements, which can happen with the high temperatures from O2 based regenerations for traditional precious metal particle filters.

A further characteristic of the coating according to the embodiment of the invention used in the exhaust gas after-treatment unit according to the invention is that the coating and, therefore, the particle filter, does not possess any catalytic activity regarding gas-gas reactions. This means that the chemical reaction which turns nitrogen monoxide (NO) to nitrogen dioxide (NO2) is not catalyzed by this coating. This shortage of catalytic activity regarding gas/gas reactions is highly significant for the exhaust gas after-treatment unit according to the invention as it is because of this that the reduction agent dosing system can be positioned close to the internal combustion engine, for example, right next to the turbo charger. Reduction agent which has possibly been incompletely converted or NH3 which has been desorbed by the first SCR catalytic converter is not oxidized to NO or N2O on the particle filter coating and can be further used in the second SCR catalytic converter for NOx reduction. There is no ammonia-blocking catalytic converter (ABC) necessary after the first SCR catalytic converter and no second reduction agent dosing position required in front of the second SCR catalytic converter. This saves costs and reduces the complexity of the exhaust gas after-treatment unit according to the invention. Furthermore, the particle filter with a coating with alkaline and/or alkaline-earth compounds can be used to improve the urea preparation, particularly to distribute the urea uniformly and to blend it with the exhaust gas.

The invention is particularly based on the conclusion that high nitrogen oxide emissions can generally be generated, particularly following an internal combustion engine start, particularly following a cold start, as well as following a motor vehicle operation in the low load range, particularly following an idle operation, also including coasting mode, during which the internal combustion engine is in its idle operation, as well as following traffic light waiting periods because the catalytic converters and filters for the exhaust gas after-treatment unit cool down in these motor vehicle operation modes and are so cold following these motor vehicle operation modes that the catalytic converters and filters must first be brought up to working temperature in the following start-up processes or acceleration processes, during which very high exhaust emissions are generated.

Exhaust gas after-treatment unit catalytic converter and filter cooling following such internal combustion engine low load operations happens more severely with correspondingly higher exhaust gas emissions for motor vehicles in the form of commercial vehicles or heavy-goods vehicles than with passenger cars because there is a comparatively large interval with an associatively large distance between the internal combustion engine and an exhaust gas after-treatment unit in commercial vehicles or heavy-goods vehicles compared to in passenger cars, whereby higher thermal losses occur in commercial vehicles or heavy-goods vehicles than in passenger cars.

For a conventional exhaust gas after-treatment unit, the introduction of reduction agent into the exhaust gas is switched off at the above-mentioned operating conditions, that means at and for a heating phase following a start, particularly a cold start, and also for a heating phase following a low load operation, as the exhaust gas has a very low temperature at these operating conditions. The introduction of reduction agent is switched off here so that the reduction agent does not crystallize. The introduction of the reduction agent is normally only switched on or implemented when an SCR catalytic converter, in which the reaction agent should be implemented, has a temperature which is higher than 180 degrees Celsius. Switching off the introduction of the reduction agent results in high nitrogen oxide emissions during the specified operating conditions if no corresponding countermeasures are met.

By using the particle filter with the coating according to the embodiment of the invention, as well as using the second SCR catalytic converter, excessive nitrogen oxide emissions can also be omitted for the described start-up or acceleration procedures following an internal combustion engine initial phase or a low load operation. Through mounting the first SCR catalytic converter at the very front of the exhaust gas after-treatment unit according to the invention in front of the particle filter, this first SCR catalytic converter is heated more quickly following an internal combustion engine cold start or following a low load operation as an additional temperature decrease before entering the SCR catalytic converter, which occurs in particle filters in conventional exhaust gas after-treatment units due a high thermal capacity, is omitted so that reduction agents can be dosed comparatively more quickly following an internal combustion engine cold start or a low load operation in the exhaust gas after-treatment unit according to this invention and nitrogen oxide can therefore be converted more quickly following an internal combustion engine cold start or a low load operation. In this way, nitrogen oxide emissions can be further reduced with an exhaust gas after-treatment unit according to the invention. Furthermore, in comparison to conventional exhaust gas after-treatment units on an oxidizing catalytic converter, particularly a DOC, it is possible to avoid this, which would cause a further temperature reduction because of its thermal capacity, so that an even more emission efficient operation can be obtained with the exhaust gas after-treatment unit according to the invention. Additionally, an especially cost and weight efficient exhaust gas after-treatment unit is possible by the omission of an oxidizing catalytic converter. A DOC application leads to high NO2 percentages for internal combustion engine idle operations. The underlying idea for the invention is to use the particle filter coating with alkaline and/or alkaline-earth compounds to use the NO2 proportion in the internal combustion engine exhaust gas, particularly following a cold start or following operation with low loads and speeds, wherein a very good cold start and emission procedure can be realized by means of the exhaust gas after-treatment unit according to the invention. Furthermore NO2 secondary emissions are kept low, particularly during urban operation, particularly through NO2 proportions in which nitrogen oxide is less than or equal to 50 percent. Furthermore, a particularly quick, O2 based soot combustion can be realized at low exhaust gas temperatures. In particular, a quick O2 soot combustion at 420 to 450 degrees Celsius, instead of at 600 degrees Celsius as is envisaged for conventional exhaust gas after-treatment units, is possible, whereby the exhaust gas after-treatment unit's thermal aging, particularly for the SCR catalytic converter and the particle filter, can be kept low.

In order to realize an operation which is particularly advantageous in terms of emissions, it is intended in the beneficial embodiment of the invention that a dosing unit is located upstream from the first SCR catalytic converter, by means of which a reduction agent for denoxing the exhaust gas can be introduced to the exhaust gas. This means that, by means of the dosing unit, the reduction agent is introduced to the exhaust gas at a specific place, wherein this place is located upstream from the first SCR catalytic converter relative to the direction of exhaust gas flow through the exhaust gas after-treatment unit. The previously described, at least partial removal of nitrogen oxide from the exhaust gas is understood as denoxing the exhaust gas. Within the framework of the selective catalytic reduction, an aqueous urea solution, ammonia, is created from the reduction agent which can react with the nitrogen oxide contained within the exhaust gas to create nitrogen and water. Due to the fact that the NH3 which is formed from the aqueous urea solution and remains in the exhaust gas is not oxidized on the coating with alkaline and/or alkaline-earth compounds on the particle filter following the first SCR catalytic converter, because coatings with alkaline and/or alkaline-earth compounds do not oxidize gaseous components, a further dosing unit before the second SCR catalytic converter in the exhaust gas after-treatment unit according to the invention can be beneficially omitted so that, beneficially, only one distribution unit is required in the exhaust gas after-treatment unit according to the invention.

By using the particle filter with the specified particle filter coating with alkaline and/or alkaline-earth compounds, it is also conceivable that a hydrocarbon dosing unit, a so-called HC doser, to introduce unconsummated hydrocarbons to the exhaust gas can be omitted and that the costs for the exhaust gas after-treatment unit according to the invention can be further reduced. Furthermore, it is also conceivable to forgo an exhaust gas recirculation (EGR) so that the exhaust gas after-treatment unit costs can be kept especially low.

In an embodiment of the invention, a control and regulating system for the exhaust gas after-treatment unit is included in a drive mechanism which, periodically and/or under given operating conditions, causes an injection or switching off of reduction agent for a predefined time frame. In a beneficial embodiment of the invention, the control and regulating system is executed as a switch-off device, by means of which an injection of reduction agent into the exhaust gas as effected by the dosing unit can be deactivated. One of the invention's underlying ideas is to temporarily interrupt the injection of the reduction agent, which is particularly an aqueous urea solution, in order to carry out a passive regeneration of the particle filter based on NO2. The passive regeneration is preferably not carried out continuously, rather in discontinuous or periodic batches.

It has also proved itself to be especially beneficial when the first SCR catalytic converter is the first exhaust gas after-treatment element through which the exhaust gas passes downstream from the internal combustion engine. In other words, the first SCR catalytic converter is the first exhaust gas after-treatment element through which the exhaust gas from the internal combustion engine passes after the exhaust gas has exited the internal combustion engine so that, relative to the direction of exhaust gas flow from the internal combustion engine to the first SCR catalytic converter, there is no exhaust gas after-treatment element to after-treat the internal combustion engine exhaust gas between the first SCR catalytic converter and the first SCR catalytic converter. In comparison to conventional exhaust gas after-treatment units, it is therefore possible, for example, to omit an oxidizing catalytic converter and, instead of this, to place the first SCR catalytic converter as the first exhaust gas after-treatment element through which the exhaust gas flows, wherein a particularly high first SCR catalytic converter NOx conversion can be realized due to high exhaust gas temperatures, particularly under the aforementioned operating conditions.

This embodiment is particularly based on the knowledge that the exhaust gas essentially cools by flowing through exhaust gas after-treatment elements, as such exhaust gas after-treatment elements always have a high thermal capacity. The cooling of the exhaust gas can only be subordinately traced back to having to a travel a long distance. This means that the omission or dropping of a particle filter and/or an oxidizing catalytic converter, particularly a DOC, in front of the first SCR catalytic converter in the direction of emission gas flow does not only result in cost savings, rather the omission of a particle filter and/or an oxidation catalytic converter is also beneficial in as far as excessive exhaust gas cooling caused by a particle filter and/or an oxidation catalytic converter can be omitted because the exhaust gas does not need to pass through a particle filter and/or an oxidation catalytic converter on its way from the internal combustion engine to the first SCR catalytic converter. The exhaust gas, therefore, benefits from having a particularly high temperature when reaching the first SCR catalytic converter so that high first SCR catalytic converter NOx conversion rates can be realized. It should be noted, that a temperature decrease due to flowing through a particle filter is generally considerably greater than a temperature decrease due to a DOC because a particle filter material has a higher thermal capacity than a DOC material and, additionally, a particle filter is generally designed to be larger. Beneficially, the exhaust gas after-treatment unit according to the embodiment of the invention can be stored particularly in a standard exhaust gas box, a so-called One Box, of a current mass-produced heavy goods or commercial vehicle whilst the first SCR catalytic converter can be inserted in the omitted oxidizing catalytic converter's place in the exhaust gas after-treatment unit, in front of a particle filter and a SCR/ASC catalytic converter in the direction of flow. The exhaust gas after-treatment unit according to this embodiment of the invention can be beneficially inserted into current mass-produced commercial vehicles without taking up extra space.

Beneficially, no further exhaust gas box is required for an exhaust gas after-treatment unit according to this embodiment of the invention, rather it is placed in the DOC so that the exhaust gas after-treatment unit according to the invention can be presented in a current mass produced commercial vehicle without taking up any extra space.

The high exhaust gas temperatures, as seen in the first SCR catalytic converter of the exhaust gas after-treatment unit according to the invention, encourages a good urea stock preparation so that the exhaust gas can be particularly well denoxed by means of the reduction agent. Therefore, a particularly good urea stock preparation upstream from or directly following an exhaust gas turbo charger, particularly following an exhaust gas turbo charger, is possible. A urea dosage in front of the exhaust gas turbo charger in the direction of exhaust gas flow is also conceivable.

Beneficially, the particle filter is the second exhaust gas after-treatment element in the exhaust gas after-treatment unit according to the invention through which the exhaust gas passes after the exhaust gas has exited the internal combustion engine so that there is beneficially no exhaust gas after-treatment element to after-treat the internal combustion engine exhaust gas between the particle filter and the first SCR catalytic converter.

It has proved itself additionally beneficial if the second SCR catalytic converter is the third exhaust gas after-treatment element through which the exhaust gas passes after the exhaust gas has exited the internal combustion engine so that there is beneficially no exhaust gas after-treatment element to after-treat the internal combustion engine exhaust gas between the second SCR catalytic converter and the particle filter.

In an embodiment of the invention, the first SCR catalytic converter has a smaller ammonia storage capacity than the second SCR catalytic converter. Additionally, in a beneficial embodiment of the invention, at least one of the SCR catalytic converters in the exhaust gas after-treatment unit according to the invention, particularly the first SCR catalytic converter, is configured as a Vanadium SCR catalytic converter, particularly with a $V_2O_5$ coating. $V_2O_5$ has a similar effect to a DOC and catalyzes an oxidation of NO to $NO_2$ so that a particle filter passive regeneration is increased, $V_2O_5$ also has a beneficially lower laughing gas selectivity ($N_2O$ selectivity) for higher $NO_2$ presences. $V_2O_5$ also benefits from having a smaller $NH_3$ storage capacity so that the Vanadium SCR catalytic converter can fill more quickly with $NH_3$ after its $NH_3$ empty run and a quicker nitrogen oxide turnover can, therefore, take place. It is particularly beneficial to implement the second SCR catalytic converter as a copper SCR (Cu SCR). A Cu SCR benefits from having good low temperature activity, good nitrogen oxide reduction rates even with small $NO_2/NO_x$ ratios and a high $NH_3$ storage capacity, particularly a higher $NH_3$ storage capacity than a vanadium SCR catalytic converter, so that the nitrogen oxide reduction with $NH_3$ in the second SCR catalytic converter implemented as a Cu SCR with the $NH_3$ stored in the second SCR catalytic converter can take place particularly beneficially for an exhaust gas after-treatment unit according to the invention in a particle filter $NO_2$ regeneration operation, with a first SCR catalytic converter designed as a vanadium SCR and a second SCR catalytic converter designed as a Cu SCR.

A further embodiment distinguishes itself in that the first SCR catalytic converter has a first volume through which the exhaust gas can flow and the second SCR catalytic converter has a second volume through which the exhaust gas can flow, wherein the first volume is smaller than the second volume. This enables a particularly efficient operation in terms of emissions to be realized. This embodiment of the invention also benefits from a nitrogen oxide reduction with $NH_3$ taking place in the second SCR catalytic converter with the $NH_3$ which is still stored in the second SCR catalytic converter after a reduction agent injection deactivation.

In one embodiment of the invention, an ammonia slip catalyst (ASC) through which the exhaust gas can flow is located downstream from the second SCR catalytic converter. Such an ASC has the objective of turning a possible reduction agent excess or ammonia into nitrogen and water so that an especially efficient operation in terms of emissions can be realized. Furthermore, unpleasant odors can also be effectively avoided. It was found that an especially efficient operation in terms of emissions for the exhaust gas after-treatment unit according to the invention can be realized if the first SCR catalytic converter's volume has a ratio to a total volume which is composed of the volumes of the second SCR catalytic converter and the volume of the ammonia slip catalyst of approximately 0.3 to 0.8.

For a further beneficial embodiment of the invention there is a dosing unit located upstream from the particle filter, by means of which unconsummated hydrocarbons can be introduced to the exhaust gas. This means that, by using the dosing unit to introduce unconsummated hydrocarbons (HC) to the exhaust gas, the unconsummated hydrocarbons are introduced to the exhaust gas at a specific place, wherein this place is located upstream from the particle filter. By introducing unconsummated hydrocarbons (HC) to the exhaust gas, the exhaust gas temperature can be raised especially effectively and according to requirement via the exothermic oxidation of HC on the first SCR catalytic converter, so that an especially efficient operation in terms of emissions can be represented. Furthermore, it is possible to use this to support or activate the active particle filter regeneration based on $O_2$, wherein this can be carried out at comparatively low temperatures. Surprisingly, it is possible to carry out both active and passive regeneration under particularly beneficial conditions by means of the particle filter coating with alkaline and/or alkaline-earth compounds and to therefore cause an effective soot reduction in the particle filter.

The dosing unit to introduce the unconsummated hydrocarbons to the exhaust gas is preferably located particularly close to the internal combustion engine, meaning it is close to the combustion engine in order to introduce the unconsummated hydrocarbons to the exhaust gas, for example, when this still has a relatively high temperature.

The invention also includes a drive mechanism for a motor vehicle, particularly a commercial vehicle, with an internal combustion engine and with an exhaust gas after-treatment unit according to the invention. Beneficial embodiments of the exhaust gas after-treatment unit according to the invention should be seen as beneficial embodiments of the drive mechanism according to the invention and vice-versa.

Furthermore, a procedure for operating a drive mechanism according to the invention also belongs to the invention. Beneficial embodiments of the drive mechanism and the exhaust gas after-treatment unit according to the invention should be seen as beneficial embodiments of the procedure according to the invention and vice-versa.

It has proved itself particularly beneficial within the framework of the procedure according to the invention if an exhaust gas temperature raise is effected by at least one measure within the combustion engine relative to the internal combustion engine. As the internal combustion engine is also described as a combustion engine, the measure is also described as a measure within the combustion engine or as an intervention within the combustion engine. The exhaust gas temperature can be purposefully increased using such an intervention within the combustion engine so that, for example, particularly effective, active O2 based particle filter regeneration can be carried out. An intervention within the combustion engine involves, for example, reducing the air mass flow rate which is carried out in at least one of the internal combustion engine's combustion chambers, particularly in the form of a cylinder. The air mass flow rate is reduced by throttling, for example. Furthermore, the intervention within the combustion engine can also include a late adjustment to the main fuel injection. Alternatively or additionally, it is conceivable that the intervention within the combustion engine comprises the implementation of downstream after-injections which only partially reburn in the combustion chamber or in the combustion engine.

Ultimately, it has also proved itself especially beneficial if the introduction of reduction agent to the exhaust gas within the framework of the procedure according to the invention is periodically deactivated or stopped under specific operating conditions for a predefined period of time. In other words, the introduction of reduction agent is designed to be periodically deactivated under certain operating conditions for a predefined period of time. Deactivating the introduction of reduction agent into the exhaust gas is particularly beneficial for carrying out passive NO2 based regeneration so that the NO2 which is required for the NO2 based particle filter regeneration is not broken down in the first SCR catalytic converter of the exhaust gas after-treatment unit according to the invention.

For the NO2 based particle filter regeneration, it is possible in the exhaust gas after-treatment unit according to the invention to interrupt the reduction agent infeeding, meaning the introduction of the reduction agent, for a set period of time because the second SCR catalytic converter has a certain NH3 storage capacity or storage space. It is understood under storage capacity or storage space that a certain amount of ammonia (NH3) can be stored in the second SCR catalytic converter. The second SCR catalytic converter's ultimate NH3 storage capacity is larger in the exhaust gas after-treatment unit according to the invention than for the first SCR catalytic converter. This is designed to realize a particularly beneficial exhaust gas after-treatment unit operation. The SCR catalytic converters' varying NH3 storage capacities can be realized, for example, in such a way that the SCR catalytic converters—as described before—are dimensioned differently, wherein the first. SCR catalytic converter, or rather its first volume, is smaller than the second SCR catalytic converter, or rather its second volume, and/or by designing a first and second SCRs with specific, different NH3 storage capacities. For example, the NH3 which is stored in the second SCR catalytic converter for the time period during which the introduction of reduction agent into the exhaust gas for an NO2 based particle filter regeneration is deactivated suffices for the nitrogen oxide (NOx) leaving the particle filter in the second SCR catalytic converter to dissipate. An especially efficient operation in terms of emissions can therefore be realized if the introduction of reduction agent into the exhaust gas stops on short notice for a predefined period of time.

It is recognizable that the particle filter coating with alkaline and/or alkaline-earth compounds distinguishes itself in that the coating catalyzes soot oxidation selectively. In contrast to conventional, precious metal particle filter coatings, particularly diesel particle filters, the particle filter coating with alkaline and/or alkaline-earth compounds for the exhaust gas after-treatment unit according to the invention has no catalytic reactivity for gas to gas reactions, under which reactions from NO to NO2, CO to CO2, HC to CO2+H2O and NH3 oxidation fall. By means of the exhaust gas after-treatment unit according to the invention, the drive mechanism according to the invention and the procedure according to the invention, secondary emissions such as NO2 und N2O, particularly under real driving conditions, can be kept low by simultaneously realizing a beneficial and efficient particle filter regeneration.

Further advantages, characteristics and details of the invention can be seen from the following description of a preferred exemplary embodiment and with reference to the drawings. The characteristics and combinations of characteristics stated above in the description and the characteristics and combinations of characteristics stated below in the description of the drawings and/or shown in the drawings alone can be used not only in the specified combination in each case, but also in other combinations or in isolation without departing from the scope of the invention.

DETAILED DESCRIPTION OF THE DRAWINGS

Identical or functionally identical elements are supplied with the same reference marks in the figures.

Figure 1:
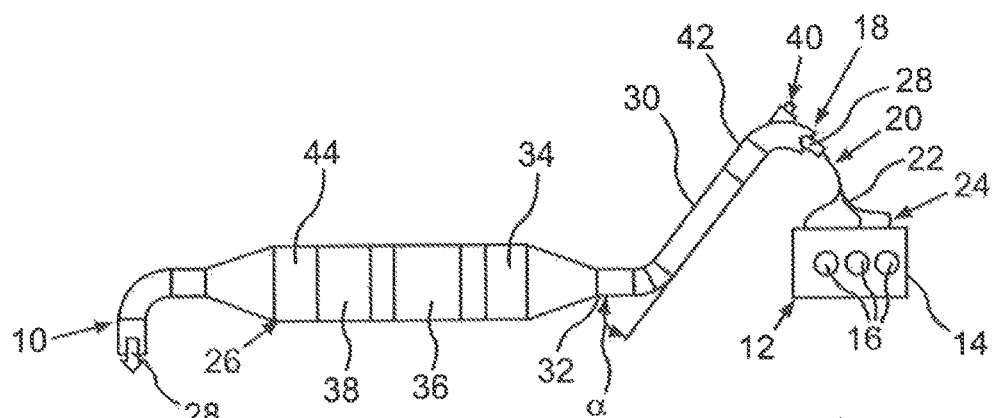
FIG. 1 is a schematic side view of an exhaust gas after-treatment unit for a motor vehicle's internal combustion engine, with a first SCR catalytic converter through which the internal combustion engine's exhaust gas can flow, with a particle filter for retaining soot particles from the exhaust gas through which the exhaust gas can flow and with a second SCR catalytic converter, through which the exhaust gas can flow, arranged downstream of the particle filter, wherein the first SCR catalytic converter is located upstream of the particle filter and wherein the particle filter is furnished with the coating with silicates containing alkaline metals.

FIG. 1 shows a drive mechanism 10 for a motor vehicle, particularly a commercial vehicle. The drive mechanism 10 comprises an internal combustion engine 12 which is presently designed as a reciprocating internal combustion engine. The commercial vehicle is, therefore, able to be driven by means of the internal combustion engine 12. The internal combustion engine 12 is designed as a diesel engine for example. The internal combustion engine 12 comprises a crankcase 14 by which a multitude of internal combustion engine 12 combustion chambers in the form of cylinders 16 are formed. During the internal combustion engine's 12 fired operation, air and fuel, particularly liquid fuel, is introduced into the cylinders mixture 16 so that there is a fuel-air mixture in each cylinder 16. This fuel-air mixture is burned which results in internal combustion engine 12 exhaust gas. The exhaust gas from the cylinders 16 is collected in the exhaust manifold 22 and then diverted out of the internal combustion engine 12.

The drive mechanism 10 further comprises an exhaust system 18 through which the exhaust gas from the cylinders 16 can flow. The exhaust system 18 is described as an exhaust tract and comprises a pipe 20 through which the exhaust gas can flow, which is described as an exhaust pipe. By means of the exhaust system 18, the internal combustion engine 12 exhaust gas is purged. The internal combustion engine 12 has a so-called outlet 24 here via which the exhaust gas from the internal combustion engine 12 flows out of and into the exhaust system 18. The outlet 24 is also described as an engine outlet or exhaust or engine exhaust and is located on an internal combustion engine 12 outlet side.

The exhaust system 18 comprises an exhaust gas after-treatment unit which is referred to as a whole as 26, by means of which the internal combustion engine 12 exhaust gas is after-treated. The exhaust gas can flow through the exhaust system 18, wherein the flow of the exhaust gas through the exhaust system 18 in FIG. 1 is illustrated using directional arrows 28. The exhaust gas after-treatment unit 26 is downstream from the outlet 24 relative to the direction of exhaust gas flow through the exhaust system 18. Because the exhaust gas is not yet after-treated by means of the exhaust gas after-treatment unit 26 upstream from the exhaust gas after-treatment unit 26 and downstream from the outlet 24, the internal combustion engine 12 emissions in an area between the outlet 24 and in front of, or upstream from, the exhaust gas after-treatment unit 26 are described as raw emissions.

The exhaust system 18 comprises at least one first exhaust gas pipe 30 through which the exhaust gas can flow as well as an attached second exhaust gas pipe 32 through which the exhaust gas can flow, which includes an angle of approximately 45 degrees with the exhaust gas pipe 30. The exhaust gas pipes 30 and 32 are located downstream from the outlet 24 here, particularly downstream from the exhaust manifold 22.

The exhaust gas after-treatment unit 26 comprises a first SCR catalytic converter 34 which is arranged as the first exhaust gas after-treatment element through which the exhaust gas passes after the outlet 24 and, therefore, after the exhaust gas has exited the internal combustion engine 12. This means that the first SCR catalytic converter 34 is the first exhaust gas after-treatment element through which the exhaust gas can flow downstream from the internal combustion engine 12, so that there is no exhaust gas after-treatment element through which the exhaust gas can flow and by means of which the exhaust gas can be after-treated between the first SCR catalytic converter 34 and the internal combustion engine 12, particularly the outlet 24.

The exhaust gas after-treatment unit 26 further comprises a particle filter 36 which is located downstream from the first SCR catalytic converter 34 relative to the direction of exhaust gas flow through the exhaust system 18 and through the exhaust gas after-treatment unit 26. The exhaust gas can also flow through the particle filter 36 here, wherein the particle filter 36 is designed to retain soot particles from the exhaust gas. This means that the soot particles contained in the exhaust gas can be retained from the exhaust gas by means of the particle filter 36. After the exhaust gas has exited the internal combustion engine 12, there are soot particles contained within the exhaust gas which are at least partially filtered from the exhaust gas by means of the particle filter 36. The soot particles are caught in the particle filter 36, particularly in the inside, or distribute themselves on the particle filter 36, particularly on the inside, so that the particle filter 36 collects more soot particles as the operating period increases. This addition is also known as particle filter 36 loading. If the internal combustion engine 12 comprises a diesel engine, for example, the particle filter 36 is also described as a diesel particle filter (DPF).

In order to realize an especially efficient operation in terms of emissions, the exhaust gas after-treatment unit 26 comprises a second SCR catalytic converter 38, through which the exhaust gas can flow, which is located downstream from the first SCR catalytic converter 34 and downstream from the particle filter 36. Furthermore, the particle filter 36 which is located downstream from the SCR catalytic converter 34 is furnished with a coating with silicates containing alkaline metals, which catalyzes the oxidation of the soot particles retained by the particle filter 36. The particle filter 36 coating catalyzes a soot oxidation, this means an oxidation of the soot particles which are retained by the particle filter 36 and are therefore found in the particle filter 36, particularly efficiently and effectively. Through this soot particle oxidation, the soot particles are removed from the particle filter 36 whereby the loading is at least reduced. This reduction in particle filter 36 loading is also known as regeneration or particle filter 36 regeneration.

The relevant SCR catalytic converter 34 or 38 serves to denox the exhaust gas. Denoxing the exhaust gas is understood as the nitrogen oxide (NOx) contained within the exhaust gas being at least partially removed from the exhaust gas so that the nitrogen oxide is reduced. The relevant SCR catalytic converter 34 or 38 thereby catalyzes the so-called selective catalytic reduction (SCR), within the framework of which, the nitrogen oxide contained within the exhaust gas reacts with ammonia (NH3) to create water and nitrogen. The ammonia provided for the SCR is introduced into the exhaust gas via a reduction agent, for example. For this purpose, the exhaust gas after-treatment unit 26 comprises a dosing unit 40 upstream from the first SCR catalytic converter 34, by means of which a reduction agent for denoxing the exhaust gas can be introduced, particularly injected, into the exhaust gas. This means that the reduction agent is introduced to the exhaust gas at a specific place by means of the dosing unit 40, wherein this place is located upstream from the first SCR catalytic converter 34 relative to the direction of exhaust gas flow through the exhaust gas after-treatment unit 26. This place is also known as the supply location. A mixing unit 42 is provided downstream from the dosing unit 40 and downstream from the supply location and upstream from the first SCR catalytic converter 34, which causes and supports the mixing of the reduction agent which is introduced into the exhaust gas with the exhaust gas.

The reduction agent is an aqueous urea solution (AUS) so that the NH3 which is generated from the reduction agent in the relevant SCR catalytic converter 34 or 38 can react with the nitrogen oxide contained within the exhaust gas to create water and nitrogen.

It is further evident from FIG. 1 that the particle filter 36 is the second exhaust gas after-treatment element through which the exhaust gas passes after the exhaust gas has exited the internal combustion engine 12 so that there is no exhaust gas after-treatment element to after-treat the exhaust gas between the first SCR catalytic converter 34 and the particle filter 36. Furthermore, the second SCR catalytic converter 38 is the third exhaust gas after-treatment element through which the exhaust gas passes after the exhaust gas has exited the internal combustion engine 12 so that there is no exhaust gas after-treatment element to after-treat the exhaust gas between the second SCR catalytic converter 38 and the particle filter 36.

Ultimately, there is an ammonia slip catalyst 44 located downstream from the SCR catalytic converter 38 which is also known as ASC and can also possess the function of an SCR catalytic converter so that the ammonia slip catalyst 44 is known as SCR/ASC for example.

It has also proved itself to be especially beneficial if the first SCR catalytic converter 34 is smaller than the second SCR catalytic converter 38. This means that the first SCR catalytic converter 34 has a first volume through which the exhaust gas can flow and the second SCR catalytic converter 38 has a second volume through which the exhaust gas can flow, wherein the first volume is smaller than the second volume. The ASC (ammonia slip catalyst 44) also has a third volume through which the exhaust gas can flow, for example, wherein the third volume is preferably smaller than the first volume and smaller than the second volume. The ratio of the first volume to the sum of the second and third volumes lies within a range of 0.32 to 0.77, inclusive. The first volume's share of the total SCR volume then lies within a range of 20 percent to 50 percent, inclusive. The total SCR volume is understood as the sum of the volumes of the components which catalyze the SCR.

By using the specified coating, two functions or active principles can be particularly used to regenerate the particle filter 36. On the one hand, a passive, NO2 based regeneration can be carried out, wherein this passive regeneration is able to be carried out with only small amounts of NO2 and with an especially high reaction rate because the reaction of the soot with the NO2 in the particle filter 36 is a solid-state reaction which is catalyzed by the coating. On the other hand, an active, O2 based regeneration, that means an O2 regeneration, can be carried out even at low temperatures. The active regeneration can, for example, be initiated in addition to passive regeneration if required. A first time period during which the passive regeneration takes place lies, for example, somewhere in the region between 5 minutes and 30 minutes, inclusive, wherein the passive regeneration is carried out, for example, cyclically during operation, for example at intervals of 10 minutes to 10 hours. A second time period during which the active regeneration takes place lies, for example, somewhere in the region between 15 minutes and 60 minutes, inclusive, and is carried out, for example, at intervals of more than 100 hours. The first time period is also known as the first regeneration period and the second time period is also known as the second regeneration period. Parameters which trigger or promote passive regeneration are named below:

counter pressure>factor 1.5 compared to empty particle filter 36 (counter pressure trigger);

favorable temperatures of more than 300 degrees Celsius and a minimum soot quantity of, for example, 2 grams per filter volume liter (temperature trigger);

model-based NH3 storage quantities in the second SCR catalytic converter>80 percent (NH3 quantity trigger); and soot loading gradient>x grams per filter volume liter and seconds (g/L*s).

Parameters which trigger or support active regeneration are named below:

model-based soot loading quantities (soot quantity trigger);

maximum duration without regeneration approx. 100 hours (time trigger);

counter pressure>factor 2 compared to empty filter (counter pressure trigger);

favorable temperatures>300 degrees Celsius and a minimum soot quantity of 5 grams per filter volume liter (temperature trigger); and model-based NH3 storage quantities in the second SCR catalytic converter>80 percent (NH3 quantity trigger).

Parameters which interrupt or end a particle filter 36 regeneration are named below:

Soot<1 gram per filter volume liter (w/l);

Counter pressure>1.1 compared to empty filter;

the SCR catalytic converter's 38 fill level is critical, meaning, for example, that the fill level is smaller than 50 percent compared to the optimum; and The NOx conversion reaches a critical threshold value which, for example, is used for on-board diagnoses (OBD).

Using the particle filter 36 with the specified coating, a particularly beneficial exhaust gas denoxing can be realized even at low temperatures and particularly during real vehicle operation, so that nitrogen oxide emissions can be kept low even following an internal combustion engine 12 cold start. The particle filter 36 can also be carried out effectively at temperatures of less than 450 degrees Celsius by means of the active regeneration. Furthermore, it is possible to use a Vanadium SCR catalytic converter as the SCR catalytic converter 34 so that an exothermal to DPF regeneration can be produced using this. Furthermore, as is evident from FIG. 1, an oxidizing catalytic converter, particularly a diesel oxidizing catalytic converter (DOC) can be forgone so that the number of components and the costs can be kept low. Furthermore, excessive exhaust gas cooling caused by an oxidizing catalytic converter and a diesel particle filter can be omitted so that the exhaust gas has a beneficially high temperature when it reaches the SCR catalytic converter 34.

Figure 2:
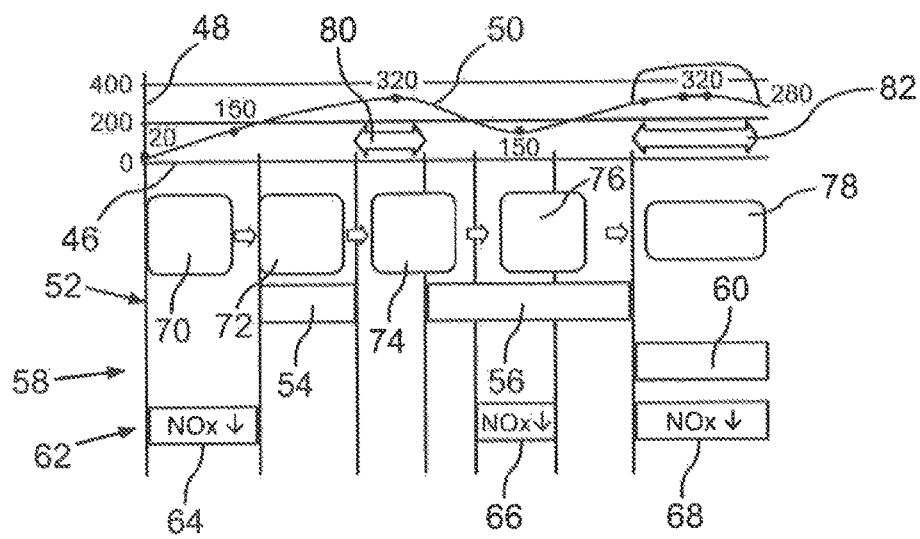
FIG. 2 is a diagram to demonstrate a procedure for exhaust gas after-treatment unit operation.

FIG. 2 illustrates a diagram by means of which a procedure for operating the drive mechanism 10, particularly from the exhaust gas after-treatment unit 26, is demonstrated. The diagram shows an abscissa 46 upon which the time, particularly the seconds, is displayed. Furthermore, the diagram shows an ordinate 48 upon which the temperature, particularly in degrees Celsius, is displayed. There is a progression 50 recorded in the diagram which illustrates the SCR catalytic converter 34 temperature. In other words, the progression 50 is a temporal progression of the SCR catalytic converter 34 temperature. A line 52 illustrates the dosing unit 40 status. The dosing unit 40 is activated with blocks 54 and 56 which are recorded in the line 52, so that blocks 54 and 56 demonstrate the relevant timespan during which the reduction agent is introduced, particularly injected, into the exhaust gas by means of the activated dosing unit 40.

Furthermore, there is a further dosing unit which is not displayed in FIG. 1, which is also known as HC doser. The HC doser is, for example, located upstream from the first SCR catalytic converter 34 and, therefore, close to the internal combustion engine 12. The HC doser is designed to introduce, particularly inject, unconsummated hydrocarbons (HC) into the exhaust gas at a further supply location. This further supply location is located beneficially upstream from the SCR catalytic converter 34. For example, the HC doser is designed to introduce fuel and, therefore, unconsummated hydrocarbons into the exhaust gas.

A line 58 on the diagram illustrates the HC doser status. A block 60 recorded in the line 58 illustrates a timespan during which the BC doser is activated, so that the unconsummated hydrocarbons (BC) can be introduced, particularly injected, into the exhaust gas by means of the activated BC doser during the timespan demonstrated by block 60. Furthermore, a line 62 on the diagram illustrates the internal combustion engine's 12 nitrogen oxide raw emission. Blocks 64, 66 and 68 recorded on the line 62 show nitrogen oxide reduction measures within the internal combustion engine. As the internal combustion engine 12 is also described as a combustion engine, the measures are also described as measures within the combustion engine or as CE measures. Blocks 64, 66 and 68 show the relevant timespan during which CE measures, that means measures within the internal combustion engine, are carried out to reduce nitrogen oxide. Such a CE measure concerns, for example, adjusting an injection point to later on. Furthermore, there can be an especially high exhaust gas recirculation rate for the CE measures. A further CE measure is, for example, to reduce the air-mass flow rate toward the relevant cylinder 16 which is, for example, reduced by throttling. This takes place, for example, by means of a throttle valve arranged on an intake channel through which the air can flow. A further CE measure can, for example, be that the internal combustion engine 12 is run or operated with higher loads.

Block 70, which has been incorporated into the diagram illustrates an internal combustion engine 12 start, particularly a cold start. At least one CE measure, which is illustrated using block 64, is carried out during this cold start. Block 72, which has been incorporated into the diagram illustrates a heating phase, during which the dosing unit 40 is activated, as is evident on block 54. An optimal phase in terms of consumption, which is illustrated using a block 74, is attached to this. A block 76 illustrates a low load internal combustion engine 12 operation, wherein at least one CE measure, illustrated in block 66, is carried out. Furthermore, the dosing unit 40 is activated (block 56). An optimal phase in terms of consumption, which is illustrated using a block 78, is attached to this, during which, for example, the HC closer is activated (block 60). Furthermore, as illustrated by block 68, at least one CE measure is carried out. It is preferably designed so that, as is evident from FIG. 2, the HC closer can only be activated if the dosing unit 40 is deactivated, meaning when the introduction of reduction agent to the exhaust gas is deactivated. If the dosing unit 40 is activated, reduction agent is introduced into the exhaust gas by means of the dosing unit 40. If the dosing unit 40 is deactivated, the introduction of reduction agent into the exhaust gas by means of the dosing unit 40 is stopped. If the HC closer is activated, unconsummated hydrocarbons (HC) are introduced into the exhaust gas by means of the HC doser. If the HC doser is deactivated, the introduction of reduction agent into the exhaust gas by means of the HC doser is stopped.

A double arrow 80 in FIG. 2 further illustrates the passive regeneration or the previously described regeneration period, wherein a double arrow 82 illustrates the active regeneration or the previously described regeneration period.

Figure 3:
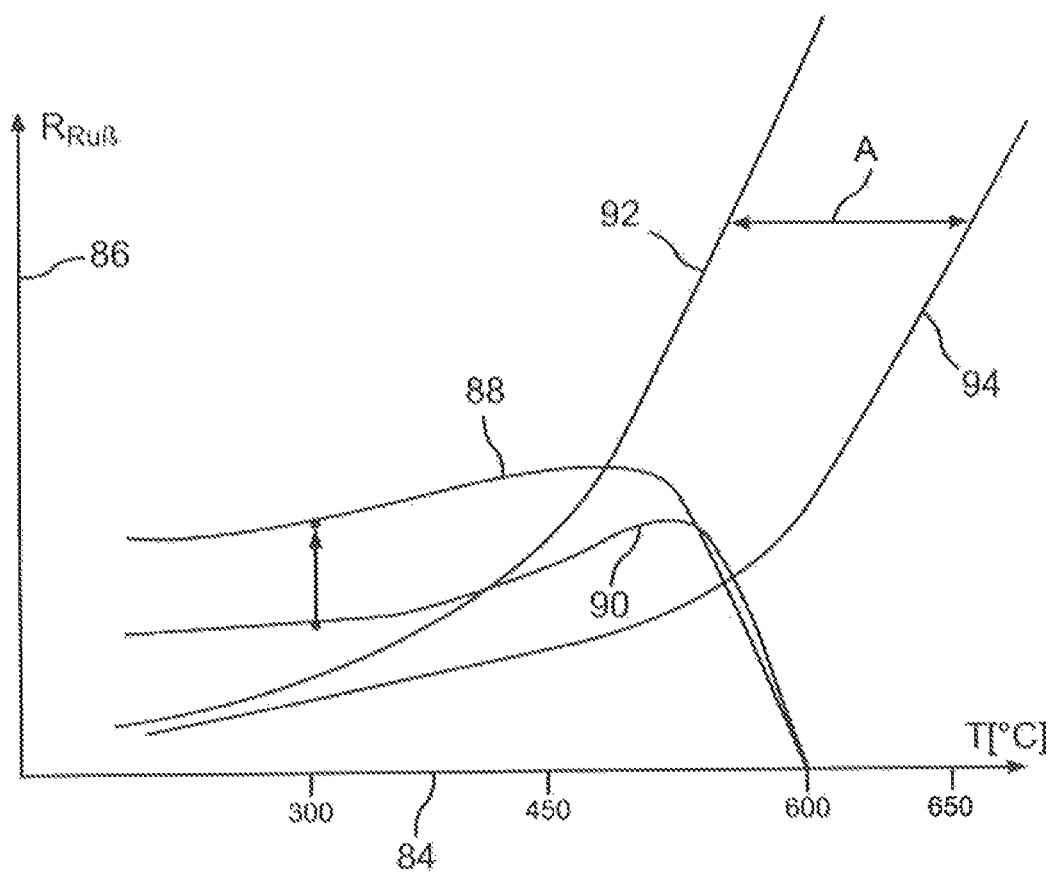
FIG. 3 is a diagram to demonstrate the effectiveness of the particle filter coating with silicates containing alkaline metals in comparison with a conventional particle filter.

FIG. 3 shows a diagram 83 which shows the benefits of a particle filter coating with silicates containing alkaline metals compared to a conventional particle filter coating containing precious metals. The diagram 83 shows an abscissa 84 upon which the temperature in degrees Celsius [° C.] is displayed. A regeneration rate Rsoot is plotted on the ordinate 83 of the diagram 86. The regeneration rate Rsoot is a measure for a quantity of soot which is removed, meaning burned away, from the particle filter 36 within a time frame. A progression 88 illustrates the particle filter 36 passive regeneration versus the temperature, wherein a progression 90 shows an NO2 based regeneration for a conventional particle filter versus the temperature. From progressions 88 and 90, it is evident that a substantially higher regeneration rate at the same temperature can be achieved by using the specified coating in comparison to traditional particle filters, so that the particle filter 36 can also be effectively regenerated if the passive regeneration is only carried out momentarily and discontinuously or periodically at low NO2 concentrations.

A progression 92 illustrates the particle filter's 36 active regeneration, wherein a progression 94 shows an NO2 based regeneration for a conventional particle filter. It should be recognized that the active regeneration using the specified coating can be effectively carried out even at significantly lower temperatures, particularly at approx. 450 degrees Celsius. A difference A between progressions 92 and 94 is approx. 150 Kelvin. This means that conventional particle filters can only be actively regenerated at approx. 600 degrees Celsius. Because the particle filter 36 can be actively regenerated even at 450 degrees Celsius, thermal damage to the exhaust gas after-treatment unit 24 can be avoided.

Although the passive regeneration is only carried out momentarily, or rather periodically or discontinuously, the particle filter 36 can be effectively regenerated by means of the passive regeneration because the particle filter 36 has the specified coating. A further advantage of using the coating is that the oxidation of NH3 can be avoided because the coating does not catalyze any gas-gas reactions. Because the exhaust gas does not flow through a DOC in which NH3 could oxidize, the dosing unit 40 can be located particularly close to the internal combustion engine outlet 40. Benefits include the higher temperature when the reduction agent is being introduced as well as a long reduction agent processing distance. Additionally, the exhaust gas does not cool excessively before reaching the first SCR due to its placement close to the engine, so that high NOx conversion can be achieved and, furthermore, a crystallization of the reduction agent can be omitted.

Figure 4:
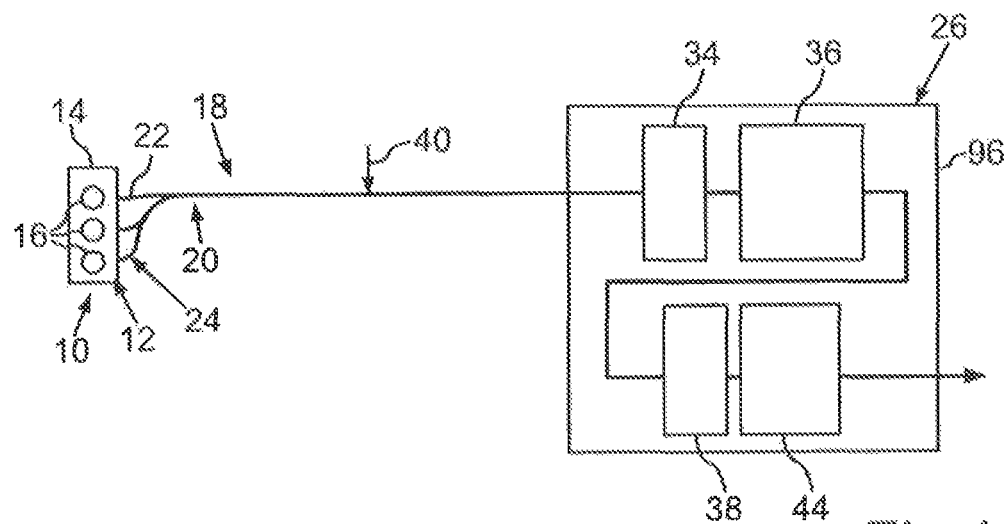
FIG. 4 is a schematic diagram for an exhaust gas after-treatment unit to demonstrate a possible integration into a commercial or heavy goods vehicle.

FIG. 4 shows a preferred possibility for integrating the exhaust gas after-treatment unit 26 according to the invention into an exhaust gas box 96, a so-called One Box, which is already provided in current, mass-produced commercial vehicles or mass-produced heavy goods vehicles, with the first SCR catalytic converter 34, the particle filter 36, the second SCR catalytic converter 38 and the ASC 44. The first SCR catalytic converter 34 is placed in the exhaust gas box 96 in the space where the omitted DOC is provided in current mass-produced motor vehicles, so that the exhaust gas after-treatment unit 26 according to the invention can be beneficially presented in a current mass-produced commercial vehicle or mass-produced heavy goods vehicle without taking up any extra space. A hydrocarbon dosing unit, a so-called HC doser, which is provided to introduce unconsummated hydrocarbons if necessary and an exhaust gas turbo charger are not presented in FIG. 4. The exhaust gas turbo charger benefits from being close to the internal combustion engine after the exhaust manifold, the HC closer benefits from being close to the reduction agent dosing unit 40.

Figure 5:
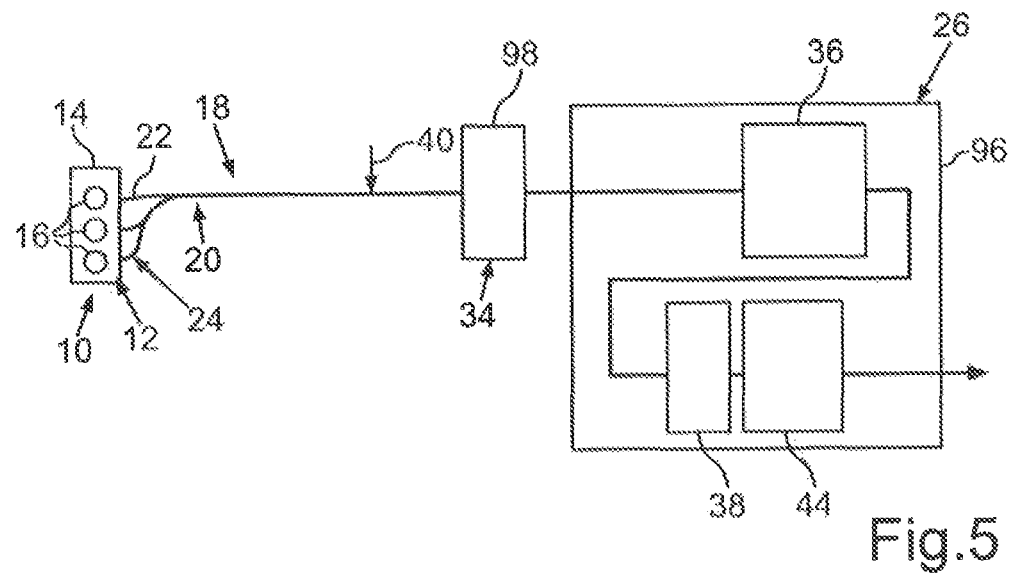
FIG. 5 is a schematic diagram for an exhaust gas after-treatment unit to demonstrate a further possible integration into a commercial or heavy goods vehicle.

FIG. 5 shows a further possibility for integrating the exhaust gas after-treatment unit 26 according to the invention into the exhaust gas box 96 and an additional exhaust gas box 98 close to the internal combustion engine. The first SCR catalytic converter is placed inside the additional exhaust gas box 98 close to the internal combustion engine. The second SCR catalytic converter 38 and the ASC 44 are housed in the particle filter's 36 exhaust gas box 96, after the SCR catalytic converter 34 in the exhaust gas box 98 in the direction of exhaust gas flow. The exhaust gas box 96 in FIG. 5 is a so-called One Box, which is already provided in modern, mass-produced commercial vehicles or mass-produced heavy good vehicles. In the integration of the exhaust gas after-treatment unit 26 according to the invention in the exhaust gas box 96 shown in FIG. 5, the DOC is omitted. With the integration of the exhaust gas after-treatment unit 26 according to the invention shown in FIG. 5, beneficially higher temperatures in the first SCR catalytic converter 34 can be beneficially achieved by the first SCR catalytic converter 34 being closer to the internal combustion engine 12, whereby higher NOx reduction rates are achievable, particularly following an internal combustion engine 12 cold start or following a low load operation. A hydrocarbon dosing unit, a so-called HC doser, which is provided to introduce unconsummated hydrocarbons if necessary and an exhaust gas turbo charger are not presented in FIG. 5. The exhaust gas turbo charger benefits from being close to the internal combustion engine after the exhaust manifold, the HC doser benefits from being close to the reduction agent dosing unit 40.

LIST OF REFERENCE CHARACTERS

10 Drive mechanism
12 Internal combustion engine
14 Cylinder casing
16 Cylinder
18 Exhaust system
20 Pipe
22 Exhaust manifold
24 Outlet
26 Exhaust gas after-treatment unit
28 Directional arrow
30 Exhaust gas pipe
32 Exhaust gas pipe
34 First SCR catalytic converter
36 Particle filter
38 Second SCR catalytic converter
40 Dosing unit
42 Mixing equipment
44 Ammonia slip catalyst
46 Abscissa
48 Ordinate
50 Progression
52 Line
54 Block
56 Block
58 Line
60 Block
62 Line
64 Block
66 Block
68 Block
70 Block
72 Block
74 Block
76 Block
78 Block
80 Double arrow
82 Double arrow
83 Diagram
84 Abscissa
86 Ordinate
88 Progression
90 Progression
92 Progression
94 Progression
96 Exhaust gas box
98 Additional exhaust gas box close to the internal combustion engine
Rsoot Regeneration rate
α Angle

The invention claimed is:

1. An exhaust gas after-treatment unit for an internal combustion engine, comprising:
    a first selective catalytic reduction (SCR) catalytic converter through which exhaust gas from the internal combustion engine is flowable, wherein the first SCR catalytic converter is a first exhaust gas after-treatment element downstream from the internal combustion engine through which the exhaust gas is flowable;
    a particle filter, wherein the particle filter is disposed downstream from the first SCR catalytic converter, wherein the exhaust gas is flowable through the particle filter, and wherein soot particles from the exhaust gas are retainable by the particle filter; and
    a second SCR catalytic converter through which the exhaust gas is flowable, wherein the second SCR catalytic converter is disposed downstream from the particle filter;
    wherein the particle filter has a heavy metal and precious metal free catalyzing coating, wherein soot particles retained by the particle filter are oxidizable by the heavy metal and precious metal free catalyzing coating, and wherein the particle filter is a second exhaust gas after-treatment element through which the exhaust gas is flowable after the exhaust gas has exited the internal combustion engine.

2. The exhaust gas after-treatment unit according to claim 1, wherein an oxidizing catalytic converter is not included in the exhaust gas after-treatment unit.

3. The exhaust gas after-treatment unit according to claim 1, wherein the heavy metal and precious metal free catalyzing coating has alkali and alkaline-earth compounds.

4. The exhaust gas after-treatment unit according to claim 1 further comprising a dosing unit disposed upstream from the first SCR catalytic converter, wherein a reduction agent for denoxing the exhaust gas is introducible to the exhaust gas by the dosing unit.

5. The exhaust gas after-treatment unit according to claim 4 further comprising a control and/or regulating system which, periodically and/or under given operating conditions, causes an injection or switching off of the reduction agent for a predefined time frame.

6. The exhaust gas after-treatment unit according to claim 1, wherein the first SCR catalytic converter has a smaller ammonia storage capacity than the second SCR catalytic converter.

7. The exhaust gas after-treatment unit according to claim 1, wherein the first SCR catalytic converter has a first volume through which the exhaust gas is flowable and the second SCR catalytic converter has a second volume through which the exhaust gas is flowable and wherein the first volume is smaller than the second volume.

8. The exhaust gas after-treatment unit according to claim 1 further comprising a dosing unit disposed upstream from the particle filter, wherein unconsummated hydrocarbons are introducible to the exhaust gas by the dosing unit.

9. The exhaust gas after-treatment unit according to claim 1 further comprising an ammonia slip catalyst through which the exhaust gas is flowable, wherein the ammonia slip catalyst is disposed downstream from the second SCR catalytic converter.

10. The exhaust gas after-treatment unit according to claim 9, wherein a volume of the first SCR catalytic converter has a ratio to a total volume which is comprised of a volume of the second SCR catalytic converter and a volume of the ammonia slip catalyst of approximately 0.3 to 0.8.

11. A drive mechanism for a motor vehicle, comprising:
an internal combustion engine; and
an exhaust gas after-treatment unit according to claim 1, wherein exhaust gas from the internal combustion engine is flowable through the exhaust gas after-treatment unit.

12. A method for operating the drive mechanism according to claim 11, wherein an exhaust gas temperature raise is effected by at least one internal measure relative to the internal combustion engine.

* * * * *